(12) United States Patent
Yoshimoto et al.

(10) Patent No.: US 6,484,854 B2
(45) Date of Patent: Nov. 26, 2002

(54) TORQUE CONVERTER

(75) Inventors: Tokuji Yoshimoto, Hamamatsu (JP); Koji Inoue, Hamamatsu (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 17 days.

(21) Appl. No.: 09/785,522

(22) Filed: Feb. 20, 2001

(65) Prior Publication Data

US 2001/0023802 A1 Sep. 27, 2001

(30) Foreign Application Priority Data

Feb. 24, 2000 (JP) ........................................ 2000-052273

(51) Int. Cl.$^7$ .............................................. F16H 45/00
(52) U.S. Cl. ........................................ 192/3.21; 60/345
(58) Field of Search ...................... 192/3.21, 45; 60/345

(56) References Cited

U.S. PATENT DOCUMENTS 5,850,897 A * 12/1998 Kimura et al. ............... 192/3.3
6,325,190 B1 * 12/2001 Yoshimoto et al. ....... 192/113.5

FOREIGN PATENT DOCUMENTS

JP          11-230303        8/1999

* cited by examiner

Primary Examiner—Rodney H. Bonck
Assistant Examiner—Dennis Abdelnour
(74) Attorney, Agent, or Firm—Arent Fox Kintner Plotkin & Kahn, PLLC

(57) ABSTRACT

A torque converter includes a turbine impeller integrally connected to a pump impeller, a side-cover having a boss and covering the turbine impeller, and a turbine shaft extending through the boss and connected to the turbine impeller. A radial bearing and a one-way clutch are disposed axially adjacent to each other between the boss of the side-cover and the turbine shaft. The radial bearing serves to retain the boss and the turbine shaft concentrically, and the one-way clutch connects the turbine shaft and the side-cover to each other, when a back load is applied to the turbine shaft. Therefore, a load received by a clutch element of the one-way clutch such as a sprag between the turbine shaft and the side-cover is equalized. Thus, when a back load is applied to the turbine shaft, a slipping between the turbine impeller and the pump impeller is prevented, thereby providing a good engine brake effect.

7 Claims, 2 Drawing Sheets

TORQUE CONVERTER

BACKGROUND OF THE INVENTION

1. Field of the Invention

The present invention relates to a torque converter which is incorporated in a transmitting system mainly in an automobile, a motorcycle or the like and which includes a pump impeller connected to an input shaft, and a turbine impeller which is opposed to the pump impeller and to which a turbine shaft is connected.

2. Description of the Related Art

Such a torque converter is widely known, for example, as disclosed in Japanese Patent Application Laid-open No. 11-230303.

In such a known torque converter, when a back load is applied to the turbine shaft, a slipping occurs between the turbine impeller and the pump impeller. For this reason, it is impossible to provide a large engine brake effect such as when a manual transmission is used.

SUMMARY OF THE INVENTION

Accordingly, it is an object of the present invention to provide a torque converter of a high durability, which is designed so that a slipping is prevented from occurring between a turbine impeller and a pump impeller upon application of the back load to a turbine shaft, thereby providing a good engine brake effect.

To achieve the above object, according to a first aspect and feature of the present invention, there is provided a torque converter comprising a pump impeller connected to an input shaft, and a turbine impeller which is opposed to the pump impeller and to which a turbine shaft is connected, wherein the torque converter further includes a radial bearing and a one-way clutch, which are disposed coaxially adjacent to each other between a boss of a side-cover integrally connected to the pump impeller to cover the turbine impeller and the turbine shaft extending through the boss and connected to the turbine impeller, the radial bearing serving to retain the boss and the turbine shaft concentrically, and the one-way clutch connecting the turbine shaft and the radial bearing to each other when a back load is applied to the turbine shaft.

With the arrangement of the first feature, when the back load is transmitted from a drive gear to the turbine shaft during deceleration of a vehicle, the one-way clutch connects the turbine shaft and the side-cover to each other, so that the back gear is transmitted from the turbine shaft directly to the side-cover and further from the pump impeller to a crankshaft. Therefore, a slipping cannot occur between the turbine impeller and the pump impeller, and a good engine brake effect can be provided. Moreover, the radial ball bearing adjacent to the one-way clutch is interposed between the turbine shaft and the side-cover to ensure the concentricity of the turbine shaft and the side-cover with each other. Therefore, a load received by the clutch element of the one-way clutch such as a sprag between the turbine shaft and the side-cover is equalized, whereby the durability of the clutch can be enhanced.

According to a second aspect and feature of the present invention, in addition to the first feature, the radial bearing is axially non-movably mounted on the boss of the side-cover, and a boss of the pump impeller is secured to the input shaft, so that a thrust load applied to an output gear which is connected to an outer end of the turbine shaft in a direction toward the turbine impeller is applied to the radial bearing.

With the arrangement of the second feature, during transmission of the torque, a thrust load generated on the output gear in the direction toward the turbine impeller is borne on the input shaft from the radial bearing through the side-cover and the pump impeller each having a relatively high rigidity. Therefore, it is possible to avoid the bearing of the thrust load on the turbine impeller and the stator impeller to enhance the durability of them.

According to a third aspect and feature of the present invention, in addition to the first or second feature, the boss of the pump impeller is secured to the input shaft, and the radial bearing has an outer race which is axially non-movably mounted to the boss of the side-cover, and an inner race which is axially non-movably retained on the turbine shaft.

With the arrangement of the third feature, an assembly of the torque converter can be formed by cooperation of the bearing and the output gear with each other before assembling of the torque converter to the crankshaft. Therefore, during assembling of the torque converter to the crankshaft, the boss of the pump impeller is secured to the input shaft. Therefore, the entire torque converter can be axially positioned and moreover, during transmission of the torque, the thrust load applied to the output gear is borne on the input shaft from the radial bearing through the side-cover and the pump impeller each having a relatively high rigidity, irrespective of the direction of the thrust load. Therefore, it is possible to avoid the bearing of the thrust load on the turbine impeller and the stator impeller to enhance the durability of them.

According to a fourth aspect and feature of the present invention, in addition to any of the first, second and third features, a seal means is provided between the turbine shaft and the side-cover at a location displaced from the radial bearing and the one-way clutch in a direction opposite to the turbine impeller for sealing the turbine shaft and the side-cover from each other.

With the arrangement of the fourth feature, the radial bearing and the one-way clutch can be lubricated by oil filling the inside of the side-cover of the torque converter, and the oil can be prevented from being leaked to the outside through between the turbine shaft and the side-cover.

According to a fifth aspect and feature of the present invention, in addition to any of the first, second and third features, the radial bearing is formed with a seal and disposed on the side opposite of the one-way clutch to the turbine impeller.

With the arrangement of the fifth feature, the one-way clutch can be lubricated by oil filling the inside of the side-cover of the torque converter, and the oil can be prevented from being leaked to the outside by the radial bearing.

According to a sixth aspect and feature of the present invention, in addition to the fifth feature, the output gear fixedly mounted at the outer end of the turbine shaft is opposed to an outer end of the boss of the side-cover, and a seal ring is slidably fitted to an inner peripheral surface of the outer end of the boss of the side-cover and come into close contact with a side face of the output gear upon reception of the pressure of the oil passed through the bearing.

With the arrangement of the sixth feature, when the seal of the radial bearing is damaged to permit the oil within the side-cover to be passed through the bearing, the pressure of the oil causes the seal ring to be forced against a bottom surface of an annular recess in the output gear, whereby the oil can be prevented from being leaked to the outside. Moreover, in a normal state in which the seal of the ball bearing has no damage, the pressure urging the seal ring against the output gear is not generated. Therefore, no frictional resistance is produced between the seal ring and the output gear and hence, it is possible to prevent a frictional loss of power due to the seal ring.

The above and other objects, features and advantages of the invention will become apparent from the following description of the preferred embodiments taken in conjunction with the accompanying drawings.

DESCRIPTION OF THE PREFERRED EMBODIMENTS

The present invention will now be described by way of embodiments with the accompanying drawings.

Figure 1:
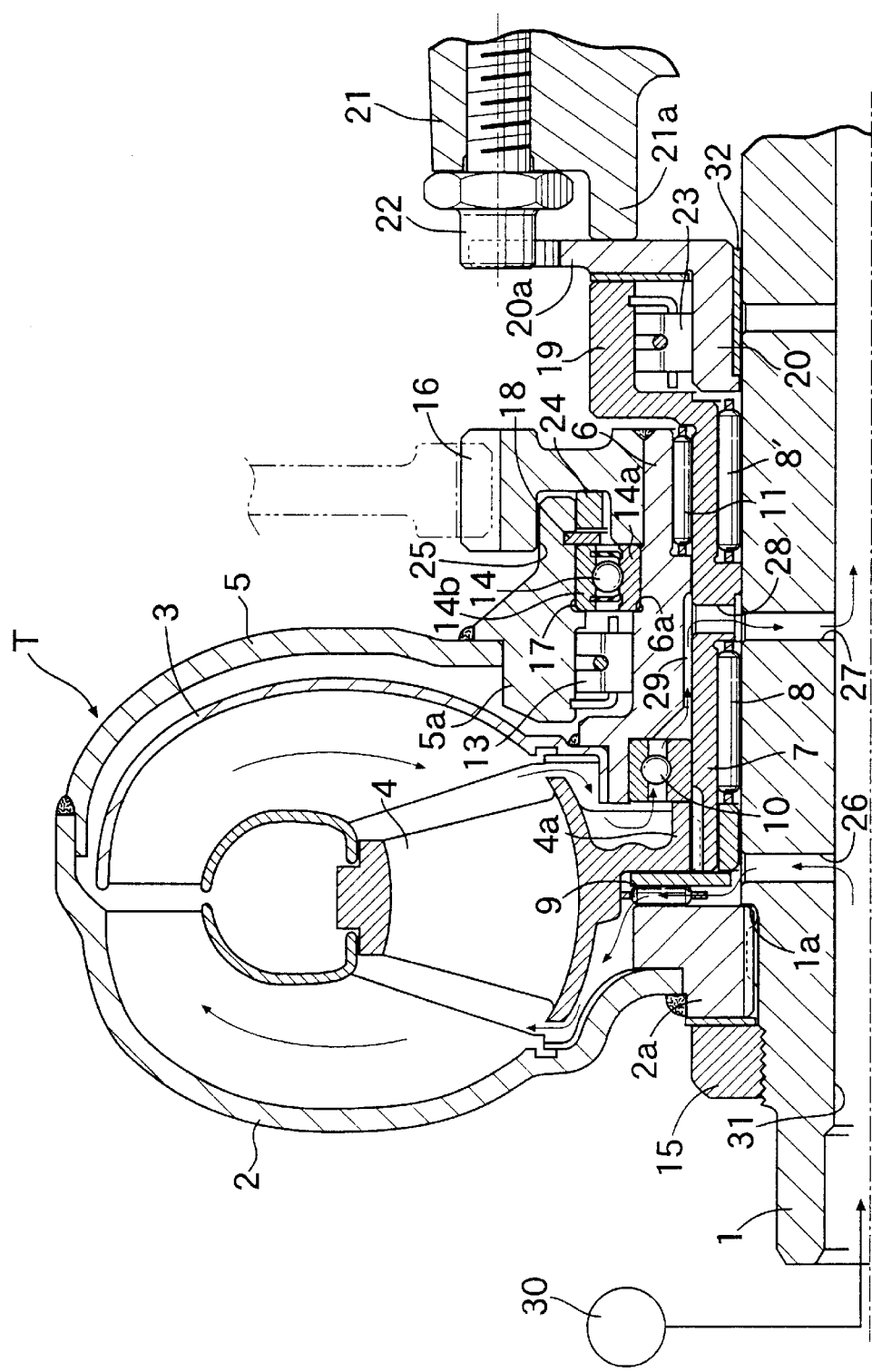
FIG. 1 is a vertical sectional view of a torque converter according to a first embodiment of the present invention.

Referring first to FIG. 1 showing a first embodiment of the present invention, a torque converter T is shown as being interposed between a crankshaft 1 of an engine serving as an input shaft and an output gear 16 driving an auxiliary multi-stage transmission (not shown). The torque converter T includes a pump impeller 2, a turbine impeller 3 with its outer periphery opposed to an outer periphery of the pump impeller 2, and a stator impeller 4 disposed between inner peripheries of the pump impeller 2 and the turbine impeller 3. A side cover 5 is integrally connected to the pump impeller 2 by welding to cover an outer side of the turbine impeller 3. The pump impeller 2 has a boss 2a spline-fitted to the crankshaft 1 and clamped by an annular shoulder 1a around an outer periphery of the crankshaft 1 and a nut 15 threadedly engaged with the crankshaft 1. In this manner, the pump impeller 2 is secured to the crankshaft 1.

The stator impeller 4 has a boss 4a spline-coupled to a stator shaft 7 carried on the crankshaft 1 with a pair of left and right needle bearings 8 and 8' interposed therebetween, and a thrust bearing 9 is interposed between the boss 4a and the boss 2a of the pump impeller 2.

The turbine impeller 3 is fitted and welded to an inner end of a turbine shaft 6 surrounding the stator shaft 7, and the turbine shaft 6 is relatively rotatably carried around an outer periphery of the stator shaft 7 with a ball bearing 10 and a needle bearing 11 interposed therebetween. In this case, the ball bearing 10 is disposed at the inner end of the turbine shaft 6, and the needle bearing 11 is disposed at an outer end of the turbine shaft 6.

A boss 5a is welded to the side cover 5 to surround the turbine shaft 6, and a one-way clutch 13 and a radial bearing 14 are disposed axially adjacent each other between an inner peripheral surface of the boss 5a and an outer peripheral surface of the turbine shaft 6 in such a manner that the one-way clutch 13 is closer to the stator impeller 4. The radial bearing 14 comprises a ball bearing having a seal, and has an inner race 14a which is fitted over the outer peripheral surface of the turbine shaft 6 and axially non-movably retained by the annular shoulder 6a on the shaft 6 and the output gear 16 secured to the outer end of the shaft 6. The radial bearing 14 has an outer race 14b which is fitted to an inner peripheral surface of the boss 5a of the side cover 5 and axially non-movably retained by an annular shoulder 17 on the inner peripheral surface of the boss 5a and a retaining ring 18 locked to the inner peripheral surface of the boss 5a. In this manner, the ball bearing 14 serves to ensure the concentricity of the turbine shaft 6 and the side-cover 5 with each other and to position the turbine shaft 6 and the boss 5a relative to each other.

The one-way clutch 13 is constructed, so that it is turned on upon application of a back load to the turbine shaft 6 to connect the turbine shaft 6 and the boss 5a of the side cover 5.

The stator shaft 7 is integrally formed with an outer shell 19 disposed adjacent to the outer side of the output gear 16, and an inner shell 20 surrounded by the outer shell 19 is relatively rotatably fitted over the crankshaft 1 with a bush 32 interposed therebetween. A free wheel 23 is interposed between the inner and outer shells 20 and 19. The inner shell 20 has a flange 20a at one end thereof. The flange 20a is engaged with a fixing pin 22 mounted on a fixing structure 21 such as a crankcase and has an outer end face carried on a positioning stopper 21a projectingly provided on the fixing structure 21.

An annular recess 25 is defined in a side of the output gear 16 for accommodation of the outer end of the boss 5a of the side cover 5, and an annular seal ring 24 is fitted to an inner peripheral surface of the outer end of the boss 5a for sliding movement between a bottom surface of the annular recess 25 and the retaining ring 18.

The crankshaft 1 is provided with a supply oil passage 31 extending through the center of the crankshaft 1, and an inlet bore 26 and an outlet bore 27 both extending radially from the supply oil passage 31. The supply oil passage 31 is connected at one end thereof to a discharge side of an oil pump 30 and at the other end thereof to an engine portion to be lubricated. The inlet bore 26 communicates with the pump impeller 2 and the stator impeller 4 through the thrust bearing 9, and the outlet bore 27 communicates with the turbine impeller 3 and the stator impeller 4 through a transverse bore 28 provided in the stator shaft 7, through a clearance 29 between the outer peripheral surface of the stator shaft 7 and the inner peripheral surface of the turbine shaft 6 and through the ball bearing 10.

The operation of the first embodiment will be described below.

During operation of the oil pump 30, a portion of oil pumped from the oil pump 30 to the supply oil passage 31 flows through the inlet bore 26 into the torque converter T, while lubricating the thrust bearing 9, thereby filling the inside of the torque converter T. Then, the oil lubricates the ball bearing 10 and flows sequentially via the clearance 29, the transverse bore 28 and the outlet bore 27 toward a downstream side of the supply oil passage 31.

When the rotation of the crankshaft 1 is transmitted to the pump impeller 2, the oil filling the inside of the torque converter T transmits the rotational torque of the pump impeller 2 to the turbine impeller 3 in a route of the pump impeller 2→the turbine impeller 3→the stator impeller 4→the pump impeller 2, while lubricating the inside of the torque converter T, thereby driving the output gear 16 from the turbine shaft 6. If a torque amplifying action has been produced between the pump impeller 2 and the turbine impeller 3 at this time, the accompanying reaction force is borne on the stator impeller 4, and the stator impeller 4 is supported on the fixing pin 22 by a locking effect provided by the free wheel 23.

When the torque amplifying action is finished, the stator impeller 4 is rotated in the same direction along with the pump impeller 2 and the turbine impeller 3, while racing the free wheel 23, as a result of the reversion in a direction of the torque received by the stator impeller 4.

When the back load is transmitted from the driving gear 16 to the turbine impeller 6 during deceleration of a vehicle, the one-way clutch 13 is brought into its turned-on state to connect the turbine shaft 6 and the side-cover 5 directly to each other and hence, the back load is transmitted from the turbine shaft 6 directly to the side-cover 5 and then transmitted from the pump impeller 2 to the crankshaft 1. Therefore, the slipping cannot occur between the turbine impeller 3 and the pump impeller 2, and a good engine brake effect can be provided.

Moreover, the radial-type ball bearing 14 adjacent to the one-way clutch 13 is interposed between the turbine shaft 6 and the boss 5a of the side-cover 5 to ensure the concentricity of the turbine shaft 6 and the boss 5a with each other. Therefore, a load received by a clutch element of the one-way clutch 13 such as a sprag between the turbine shaft 6 and the boss 5a is equalized, whereby the durability of the clutch 13 can be enhanced.

The one-way clutch 13 is disposed at a location displaced from the ball bearing 14 toward the turbine impeller 3 and hence, the side-cover 5 of the torque converter T can be lubricated by the oil filling the inside of the side-cover 5. Moreover, such oil is inhibited from being leaked to the outside by the ball bearing 14 having the seal. When the seal of the ball bearing 14 is damaged to permit the oil within the side-cover from being passed through the ball bearing 14, the pressure of such oil causes the seal ring 24 to be urged against the bottom surface of the annular recess 25 of the output gear 16, thereby making it possible to prevent the leakage of the oil to the outside of the output gear 16 to the utmost. Moreover, in a normal state in which the seal of the ball bearing 14 has no damage, the pressure urging the seal ring 24 against the output gear 16 is not generated. Therefore, no frictional resistance is produced between the seal ring 24 and the output gear 16 and hence, it is possible to prevent a frictional loss of power due to the seal ring 24. The end of the boss 5a supporting the seal ring 24 is accommodated in the recess 25 of the output gear 16, whereby the structure around the seal ring 24 can be formed compactly.

In addition, the bearing 14 axially connects the turbine shaft 6 and the boss 5a of the side-cover 5 by cooperation with the output gear 16 and hence, an assembly of the torque converter T can be formed by a simple structure before assembling of the torque converter to the crankshaft 1. Therefore, during assembling of the torque converter to the crankshaft 1, the axial positioning of the entire torque converter T can be achieved only by securing the boss 2a of the pump impeller 2 to the crankshaft 1. Moreover, during transmission of the torque, a thrust load generated on the output gear 16 is borne on the crankshaft 1 from the bearing 14 through the side-cover 5 and the pump impeller 2 each having a relatively high rigidity, irrespective of the direction of the thrust load. Therefore, it is possible to avoid the bearing of the thrust load on the turbine impeller 3 and the stator impeller 4 to enhance the durability of them.

A second embodiment of the present invention will now be described with reference to FIG. 2.

The stator shaft 7 is relatively rotatably carried on the crankshaft 1 through a bush 35 and a needle bearing 8' interposed therebetween. The stator shaft 7 is integrally formed at its outer end with a flange 7a, which is engaged directly with the fixing pin 22 and carried on the outer end face of the stopper 21a. The free wheel 23 is interposed between the outer peripheral surface of the inner end of the stator shaft 7 and the inner peripheral surface of an outer shell 37 spline-coupled to the inner peripheral surface of the stator impeller 4.

The outer shell 37 and a spacer 38 superposed on one end of the outer shell 37 are disposed between the plate-shaped boss 4a of the stator impeller 4 and the boss 3a of the turbine impeller 3. In order to lubricate the free wheel 23, an axial through-bore 39 and a radiate groove 40 are provided in the boss 4a, and an axial through-bore 41 and a radiate groove 42 are also provided in the spacer 38.

The turbine shaft 6 is carried on the stator shaft 7 with a pair of needle bearings 36 and 11 interposed therebetween, and is spline-fitted at its inner end into the boss 3a of the turbine impeller 3. An output gear 16 is integrally formed on the outer periphery of the outer end of the turbine shaft 6.

A radial-type ball bearing 14' is disposed axially adjacent to the one-way clutch 13 between the boss 5a of the side-cover 5 and the turbine shaft 6, with no seal provided thereon, unlike the ball bearing 14 having the seal in the first embodiment. In this case, the ball bearing 14' has an outer race 14b', which is axially non-movably retained by an annular shoulder 43 on the inner peripheral surface of the boss 5a of the side-cover 5 and a retaining ring 44 engaged with the inner peripheral surface of the boss 5a, and an inner race 14a', which is axially non-movably retained by an annular shoulder 6b on the outer peripheral surface of the turbine shaft 6 and the boss 3a of the turbine impeller 3. In this case, any one of the ball bearing 14' and the one-way clutch 13 may be optionally disposed inside the torque converter T.

In order to inhibit the axially outward movement of the turbine shaft 6, a thrust washer 45 is inserted into between the outer end face of the turbine shaft 6 and the flange 7a.

To make up for the provision of no seal on the ball bearing 14', a seal member 47 (a seal means) is interposed between the inner peripheral surface of a larger-diameter portion of the annular recess 25 in the output gear 16 and the outer peripheral surface of the outer end of the boss 5a of the side-cover 5 forced into the annular recess 25 for sealing such inner and outer peripheral surfaces from each other. In the case of the illustrated embodiment, the seal member 47 is mounted in an annular groove 48 defined in the outer peripheral surface of the boss 5a to come into close contact with the inner peripheral surface of the larger-diameter portion of the annular recess 25 for relative rotation.

The clearance 29 provided between the stator shaft 7 and the turbine shaft 6 communicates with the radiate groove 42 in the spacer 38 through the needle bearing 36. The stator shaft 7 is provided with a transverse bore 28 permitting the clearance 29 to communicate with the outlet bore 27 in the crankshaft 1.

Figure 2:
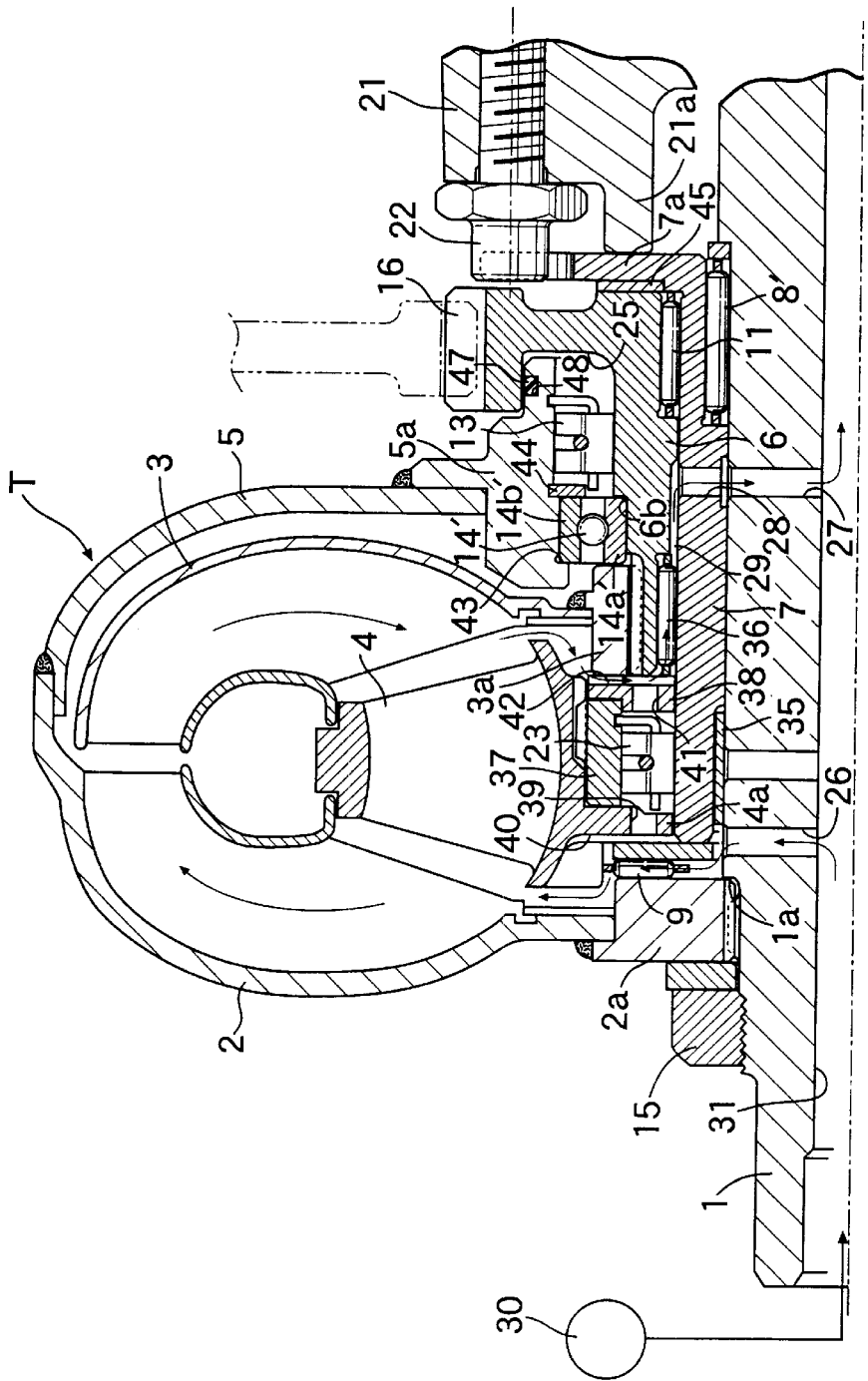
FIG. 2 is a vertical sectional view of a torque converter according to a second embodiment of the present invention.

Other constructions are substantially the same as in the previous embodiments and hence, portions or components corresponding to those in the previous embodiments are designated by like reference characters in FIG. 2, and the description of them is omitted.

The ball bearing 14' arranged axially adjacent to the one-way clutch 13 ensures the concentricity of the turbine shaft 6 and the boss 5a of the side-cover 5 with each other. Therefore, as in the previous embodiments, a load received by the clutch element of the one-way clutch 13 between the turbine shaft 6 and the boss 5a is equalized, whereby the durability of the clutch 13 can be enhanced.

During the operation of the torque converter T, oil flowing through the supply oil passage 31 in the crankshaft 1 into the inlet bore 26 flows via the thrust bearing 9 into the torque converter T, as in the previous embodiments, but a portion of such oil is passed through the radiate groove 40 and the axial through-bore 39 in the boss 4a of the stator impeller 4 to lubricate the free wheel 23. The oil within the torque converter T is passed sequentially through the radiate groove 42 in the spacer 38, the needle bearing 36 and the clearance 29, and discharged through the transverse bore 28 and the outlet bore 27 into the supply oil passage 31, as in the previous embodiments.

The oil filling the inside of the side-cover flows sequentially to the ball bearing 14' and the one-way clutch 13 to lubricate them, and such oil is prevented from being leaked to the outside by the seal member 47 mounted between the boss 5a and the output gear 16.

During transmission of the torque, a thrust load applied to the output gear 16 in a direction toward the turbine impeller 3 is borne on the crankshaft 1 from the bearing 14 through the side-cover 5 and the pump impeller 2 each having a relatively high rigidity, and a thrust load in a direction opposite to the direction toward the turbine impeller 3 is borne on the stopper 21a of the fixing structure 21 through the thrust washer 45 and the flange 7a. Therefore, it is possible to avoid the bearing of the thrust load on the turbine impeller 3 and the stator impeller 4 to enhance the durability of them.

Although the embodiments of the present invention have been described in detail, it will be understood that the present invention is not limited to the above-described embodiments, and various modifications in design may be made without departing from the spirit and scope of the invention defined in claims.

For example, in the second embodiment, a seal member may be interposed directly between the inner peripheral surface of the boss 5a and the outer peripheral surface of the turbine impeller 6, in place of the seal member 47 between the boss 5a and the output gear 16.

What is claimed is:

1. A torque converter comprising a pump impeller connected to an input shaft, and a turbine impeller which is opposed to said pump impeller and to which a turbine shaft is connected, wherein said torque converter further includes a radial bearing and a one-way clutch, which are disposed coaxially adjacent to each other between a boss of a side-cover integrally connected to said pump impeller to cover said turbine impeller and said turbine shaft extending through said boss and connected to said turbine impeller, said radial bearing serving to retain said boss and said turbine shaft concentrically, and said one-way clutch connecting said turbine shaft and said radial bearing to each other when a back load is applied to said turbine shaft, wherein said radial bearing is axially non-movably mounted on said boss of said side-cover, and a boss of said pump impeller is secured to said input shaft, so that a thrust load applied to an output gear which is connected to an outer end of said turbine shaft in a direction toward said turbine impeller is applied to said radial bearing.

2. A torque converter according to claim 1, wherein said boss of said pump impeller is secured to said input shaft, and said radial bearing has an outer race which is axially non-movably mounted to said boss of said side-cover, and an inner race which is axially non-movably retained on said turbine shaft.

3. A torque converter according to claim 1, further including a seal means provided between said turbine shaft and said side-cover at a location displaced from said radial bearing and said one-way clutch in a direction opposite to said turbine impeller for sealing said turbine shaft and said side-cover from each other.

4. A torque converter according to claim 1, wherein said radial bearing is formed with a seal and disposed on the side opposite of said one-way clutch to said turbine impeller.

5. A torque converter according to claim 4, wherein said output gear fixedly mounted at the outer end of said turbine shaft is opposed to an outer end of said boss of said side-cover, and a seal ring is slidably fitted to an inner peripheral surface of the outer end of said boss of said side-cover and come into close contact with a side face of said output gear upon reception of the pressure of the oil passed through said bearing.

6. A torque converter comprising a pump impeller connected to an input shaft, and a turbine impeller which is opposed to said pump impeller and to which a turbine shaft is connected, wherein said torque converter further includes a radial bearing and a one-way clutch, which are disposed coaxially adjacent to each other between a boss of a side-cover integrally connected to said pump impeller to cover said turbine impeller and said turbine shaft extending through said boss and connected to said turbine impeller, said radial bearing serving to retain said boss and said turbine shaft concentrically, and said one-way clutch connecting said turbine shaft and said radial bearing to each other when a back load is applied to said turbine shaft, wherein said radial bearing is formed with a seal and disposed on the side opposite of said one-way clutch to said turbine impeller.

7. A torque converter according to claim 6, wherein said output gear fixedly mounted at the outer end of said turbine shaft is opposed to an outer end of said boss of said side-cover, and a seal ring is slidably fitted to an inner peripheral surface of the outer end of said boss of said side-cover and come into close contact with a side face of said output gear upon reception of the pressure of the oil passed through said bearing.

* * * * *